Feb. 7, 1956   L. H. REYERSON   2,733,992
PULPING WOOD WITH NITROGEN OXIDES
Filed July 12, 1952   2 Sheets-Sheet 1

INVENTOR.
LLOYD H. REYERSON
BY
Paul, Moore & Lugger
ATTORNEYS

Feb. 7, 1956 — L. H. REYERSON — 2,733,992
PULPING WOOD WITH NITROGEN OXIDES
Filed July 12, 1952 — 2 Sheets-Sheet 2
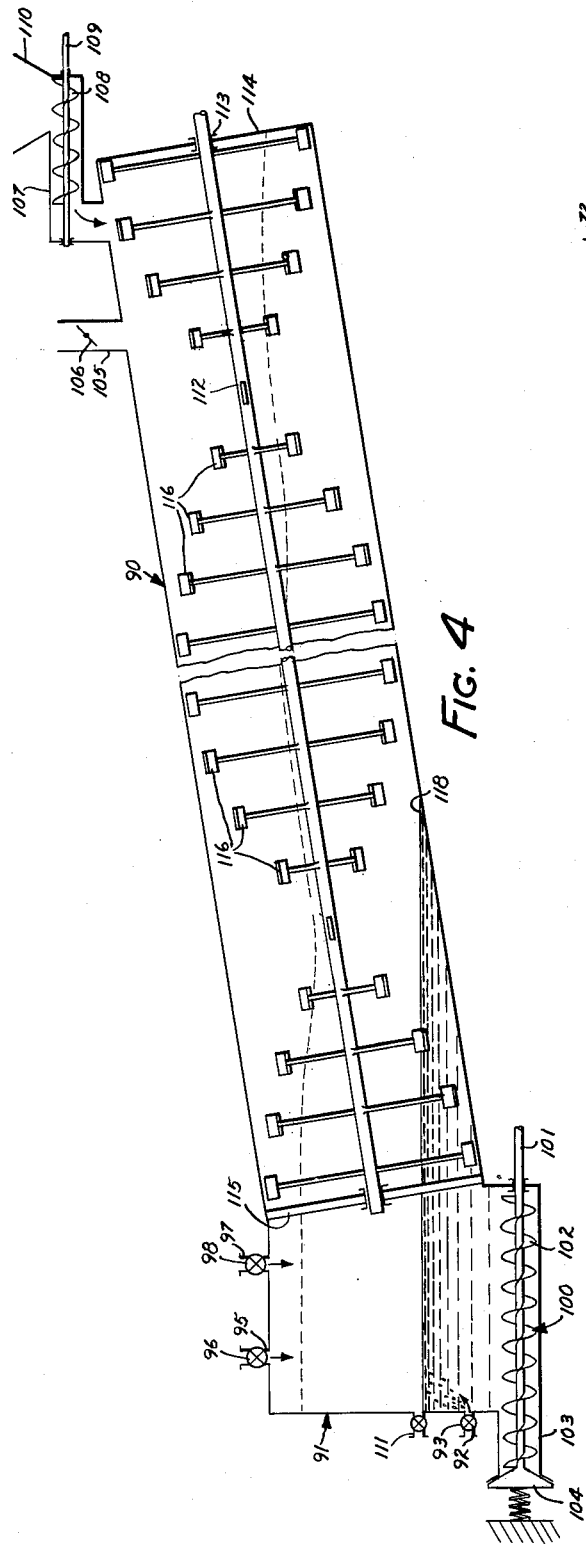
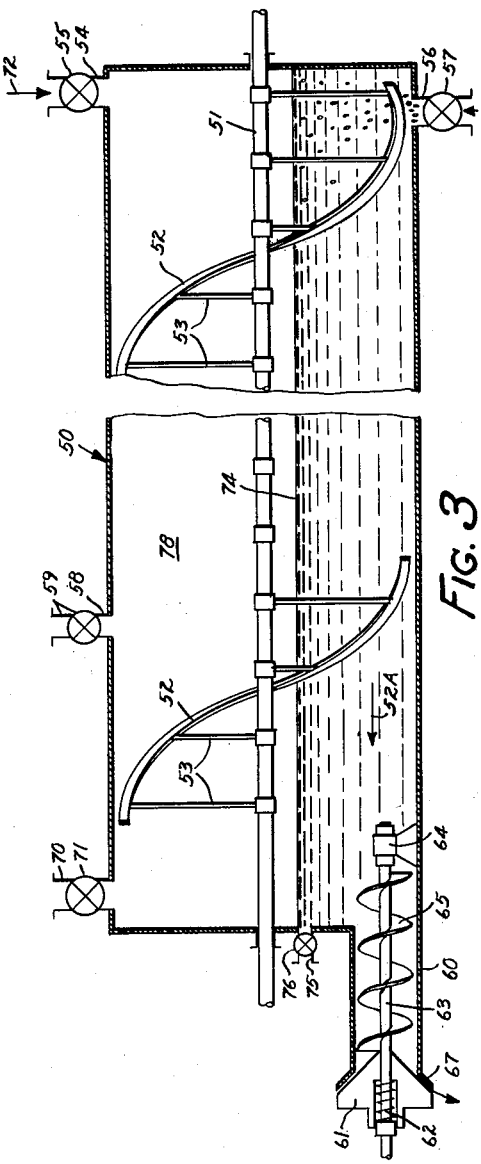
INVENTOR.
LLOYD H. REYERSON
BY
*Paul, Moore & Ruggee*
ATTORNEYS

United States Patent Office 2,733,992
Patented Feb. 7, 1956

2,733,992
PULPING WOOD WITH NITROGEN OXIDES

Lloyd H. Reyerson, St. Paul, Minn., assignor to Regents of the University of Minnesota, Minneapolis, Minn., a corporation of Minnesota Application July 12, 1952, Serial No. 298,556

8 Claims. (Cl. 92—9)

This invention relates to processes and apparatus for pulping of wood and particularly to processes and apparatus for the pulping of wood utilizing furnace gases containing oxides of nitrogen and nitric acid as the pulping agent. In Patent No. 2,301,314, there is described and claimed processes for the pulping of wood of both the deciduous and coniferous varieties utilizing dilute nitric acid as the active pulping reagent. According to this patent the delignification of the cellulosic material is accomplished by treating the cellulosic material, such as wood chips, excelsior, sawdust and the like with solutions containing from 1½% to 10% nitric acid, by weight, at temperatures in the range of 140° F. to around 210° F. The preparation of the acidic pulping reagent, viz. the nitric acid solution, of that patent utilized nitric acid of a more concentrated type, which was then diluted to the strength desired. Commercial utilization of the process of Patent No. 2,301,314 accordingly has depended upon the price of nitric acid of commercial grades for preparation of the dilute solution used in the pulping procedure.

I have discovered that pulping of wood and the like cellulosic materials may be accomplished by utilizing furnace gases containing oxides of nitrogen and nitric acid as the essential pulping reagent and that such oxides of nitrogen may be utilized directly as produced in accordance with Patents Nos. 2,422,081 and 2,578,674. In the latter patents there are specified methods by which nitric oxide, NO, may be produced by thermal methods. According to those patents a mixture of gases may be produced in appropriately designed furnaces operated according to a specified manner and that the gases given off by the furnace contain from 1% to 2% by volume of nitric oxide, NO, along with carbon dioxide, oxygen, water, water vapor and nitrogen. Thus, as stated in Patent No. 2,578,674, the furnace gas mixture effluent typically produced by the specified furnaces is given off at a temperature of 660° F. and contains according to a typical analysis 5.1% $CO_2$; 13% $O_2$; 5.5% $H_2O$; 75.4% $N_2$; and 1% NO, by volume.

It is well known that the oxidation of nitric oxide, NO, to nitrogen dioxide, $NO_2$, takes place spontaneously at definite rates dependent upon the temperature and the concentration of the reacting gases. It is also well known that a mixture of NO and $NO_2$ can under some conditions form some $N_2O_3$. Thus, according to Patent 2,578,674, the gaseous mixture at 660° F., for example, and containing 1% by volume of NO, may be cooled to about 60° F. or thereabouts by appropriate water spray and that the resultant cooled furnace gas effluent will contain slightly less than 1% of NO, part of the NO being lost by reason of oxidation of some nitric oxide to nitrogen dioxide and reaction of the latter with water to form nitric acid.

It is an object of the present invention to provide a pulping method by which the economically produced furnace effluent gas mixtures made in accordance with Patents 2,422,081 and 2,578,674 may be utilized directly for the pulping of cellulose material, particularly wood.

It is another object of the invention to provide an improved procedure whereby dilute furnace gases containing relatively minor proportions of nitric oxide, NO, may be utilized for providing the same delignification action as is provided in Patent No. 2,301,314, wherein dilute nitric acid was used as the delignifying or pulping reagent.

It is another object of the invention to provide improved procedures for the continuous pulping of wood utilizing furnace gas effluent containing oxides of nitrogen and dilute nitric acid formed therefrom as the pulping reagent.

It is a further object of the invention to provide an improved process for the production of useful wood pulp using as the essential pulping reagent furnace gases containing oxides of nitrogen.

Other and further objects of the invention are those inherent in the methods and apparatus herein illustrated, described and claimed.

The invention is illustrated with reference to the drawings in which corresponding numerals refer to the same parts and in which Figure 1 is a schematic view, partly in vertical section, showing an illustrative form of apparatus wherein the process of the invention may be carried out;

Figure 3 is a vertical sectional view through a still further modified form of furnace illustrating how the processes may be carried out on a continuous basis;

Figure 4 is a vertical sectional view through a further modified form of the invention for continuous pulping of wood.

In carrying out the invention there is provided apparatus and processes such as those specified in Patent 2,422,081 and referred to in Patent 2,578,674 for the production of a furnace gas effluent containing oxides of nitrogen. While according to these patents the oxides of nitrogen are predominately nitric oxide (NO) and range from less than 1% to perhaps 2%, it is probable that other oxides of nitrogen, such as nitrogen dioxide ($NO_2$) or nitrogen trioxide ($N_2O_3$) and nitrogen tetroxide ($N_2O_4$) may be present in some degree. The production of such gases containing nitrogen oxides in itself forms no part of the present invention, and it is assumed that a suitable furnace is provided and that the effluent thereof is available in sufficient volume for carrying out the hereinafter described processes.

Figure 1:
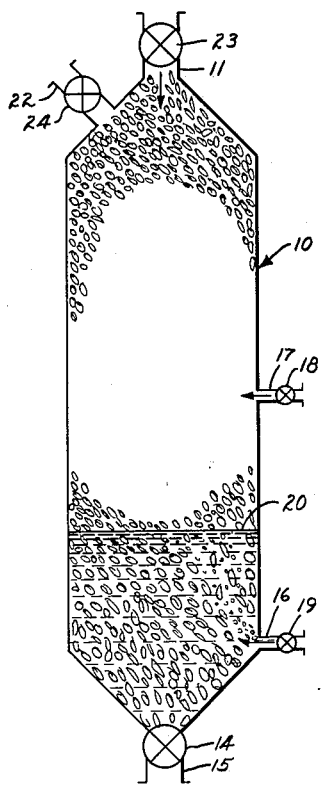

In carrying out the invention there is likewise provided an adequate source of cellulosic material, viz. wood, which may be deciduous or coniferous wood, such as aspen, jack pine, basswood, hemlock, spruce, long leaf pine, slash pine, etc. These woods are conveniently used in the form of chips which are produced by machinery available for such chipping purposes. For the carrying out of the processes of this invention the chips are preferably in a pre-moistened state, although they may be moistened as a preliminary step in the process. Thus, referring to Figure 1 there is provided a digester 10 which is vertically arranged and provided with an inlet opening 11 at its upper end for the introduction of the chips, which are to be pluped, into the digester apparatus. At the bottom of the digester there is generally provided a conical sheet terminating at the blow-off valve 14 which may be open or closed having a delivery port 15 that delivers into the stuff chest. At several levels along the side of the digester 10 there are one or more ports as at 16 and 17, each provided with a valve as at 18 and 19. Several ports 16 may be located at various points around the digestive chamber at the level 16 and several others may be provided at the level 17.

In carrying out the process the chips of cellulosic material, such as jack pine or aspen chips, may be introduced into the digester, and if not previously moistened, there is then introduced enough moisture or waste steam or dilute acid liquor from a prior run, so as thoroughly to wet the chips and to provide enough liquid in the digester for submerging approximately the lower third of the chips therein. The level 20 of liquid in the digester should be above the level of the port 16 but need not be excessively above it. After the wood chips are placed in the digester and thoroughly wetted, there is introduced into the port or ports 16 the furnace gas effluent, above referred to, containing oxides of nitrogen. The furnace gases may be introduced directly into the wood chips at the temperature at which they are produced, viz. at around 600 to 700° F., and since they go into the liquid below level 20, they heat the liquid, or the furnace gases may be cooled before introduction, as in accordance with Patent 2,578,674 to a temperature between 60° F. and 70° F. I prefer, however, to cool the gases to a temperature between 60° and 210° F., thus to a temperature approximating the temperature of digestion of the chips or slightly higher, so as to hold the temperature of the digestion or add such heat as required during the digesting process. The furnace gas effluent entering at port 16 bubbles through the liquid up to level 20 and then passes upwardly through the chips in the digester and is vented through the port 11 or through ports separately provided as at 22 at the top of the digester. Both the port 11 and the port 22 may have valves as at 23 and 24. Thus, in accordance with this invention, there is introduced at the level 16 the mixture of furnace gases at a temperature ranging from 60° F., as when they are precooled, to a temperature of 660° F. or slightly higher. The gases contain oxides of nitrogen, including predominantly nitric oxide, in an amount ranging from 0.7% to 2% by volume. The nitric oxide (NO) which is predominantly present oxidizes to nitrogen dioxide ($NO_2$), and these gases, viz. NO and $NO_2$ may combine to form the other oxides of nitrogen previously mentioned. The mixture of oxides of nitrogen thus present will also react with the moisture present within the digester to form some dilute nitric acid. It has been discovered in operation of the processes described in Patent No. 2,301,314, the use of dilute nitric acid as the pulping reagent provided an evolution of gases including NO, $N_2O$ and $N_2$, thus demonstrating that the oxygen combined with the nitrogen (in the nitric acid pulping reagent of Patent 2,301,314) is given up in the pulping reaction, and the nitrogen is either reduced to an oxide of lower oxygen content or entirely reduced to gaseous nitrogen. According to the present invention the continuous introduction of furnace gases during some or all of the time period of the pulping procedure, restores the oxidizing potential of the pulping reagents. However, it may be observed that in passing through the digester 10 there is a reduction of the oxides of nitrogen and as a result the gases evolved and given off at the port 22, when the valve 24 is open, will contain almost no nitric oxide or the higher oxides of nitrogen, but rather will include nitrous oxide and nitrogen. It is a feature of the invention to restore or maintain the oxidizing potential of the nitrogen oxides of the digestion liquor by an inflow of additional furnace gases which may be continued through some or all of the digestion period. It is unnecessary, however, to introduce so much furnace gases as to provide a full nitric oxide outflow at vent 27. It will be remembered, of course, that the furnace gas introduced at the bottom of the furnace through port or ports 16 contains liberal quantities of oxygen and nitrogen as well as water vapor and these carry through the digester and are evolved at the venting port 22 without entering into the reaction.

The temperature maintained during the digestion period ranges from about 140° F. to 210° F. and the time of pulping ranges from 5 to about 25 hours. After the pulping procedure is complete, the valves 23 and 24 are closed for a short period so as to build up a slight pressure within the digester 10 and valve 14 is then opened, whereupon the digester is blown and the resultant cooked chips are dumped into the stuff box below the port 15. The resultant cooked chips are then drained, steamed and rinsed and treated with dilute sodium hydroxide solution, all as set forth in Patent 2,301,314, for completing the pulping operation. Thus, the chips obtained from processing in the digester 10 are first drained of the acid solution adhering to them. This solution may be saved and re-used in another run. The chips are then steamed for ½ hour to 1 hour and the resultant condensate either discarded or saved according to the economies of the process. The chips are then rinsed, first with hot and then with cold water. The treatment with steam and rinsing has for its primary purpose the removal of acid residues on the chips, so as thereby to reduce the cost of caustic treatment which follows. The chips are then treated with a dilute caustic solution, such as 2% caustic solution, for about two hours and the resultant chips mildly agitated. This yields a good pulp which may be washed and then bleached in the usual manner.

The furnace gases produced as in Patent 2,422,081 and referred to in 2,578,674 above, at the point of delivery from the furnace have a temperature of between 600° and 700° F. and at such temperature the oxides of nitrogen are believed to be nitric oxide (NO), but when cooled, as by spraying water therethrough, and reduced to around 60° F. and held for a few minutes, the nitric oxide (NO) is converted to nitrogen dioxide ($NO_2$). Such cooling to 60° F. or temperatures in that approximate range, favors the production of nitrogen dioxide if the gases are held for a period of 4 to 10 minutes or thereabouts, and utilizing these facilities in the present invention is contemplated.

Accordingly, the gases introduced into the digester, at ports 16, may be precooled to a temperature of 60° F. and by passage through a holding tube, may be held for sufficient time, 4 to 10 minutes or longer, for the development of nitrogen dioxide ($NO_2$) and then introduced into the digester. When this occurs, additional sources of heat may be provided so as to maintain the chosen digestion temperature between 140° F. to 210° F. I prefer, therefore, to cool the furnace gases only so much as is necessary to reach the approximate temperature of digestion carried on within the digester 10. If desired, a mixture of furnace gases at 660° F. and some furnace gases cooled to a lower temperature may be used so as to provide the appropriate temperature for introduction into the digester, or the gases cooled and held may be reheated partially by fresh furnace gases, using a suitable heat exchanger, before being introduced into the digester.

In some instances it is desirable to introduce additional furnace gases, either at the temperature of production of 660° F. or at a lower temperature down to 60° F. at one or more levels 17 into the chips so as to maintain the oxidizing potential within the digester at higher levels in the digester.

Where furnace gases at the higher temperatures indicated are introduced in the digester, they are introduced below the level of the liquid therein, or with water or wet steam sufficient to absorb their heat before contacting the chips. This avoids burning the chips.

The amount of furnace gases so introduced into the digester depends upon the tonnage of chips. Thus, for each ton of wood chips, dry basis, there is introduced into the digester from 350 pounds to 500 pounds of nitric oxide (NO). This may be at the temperature of the furnace gases as produced or as cooled. However, when thus cooled, the cooling itself favors the production of nitrogen dioxide ($NO_2$) as previously described, and the mixture introduced into the digester may therefore contain both nitric oxide (NO) and nitrogen dioxide (NO₂) and possibly other oxides of nitrogen. When calculated on the basis of nitrogen dioxide (NO₂) the amount of gas introduced is 500 to 600 pounds of NO₂ for each one ton of wood chips, dry basis. For a mixture of equal volumes of NO and NO₂ the amount used is 350 pounds to 600 pounds of such mixture of nitrogen oxides for each ton, dry basis, of wood chips. Theoretically, 350 pounds of nitric oxide (NO) as a minimum is required for each ton, dry basis, of wood chips that are digested, and I prefer to use up to 50% excess so as to maintain the oxidizing potential within the digester. Thus, the oxidizing potential of nitrogen dioxide (NO₂) and the higher oxides of nitrogen is greater than is the oxidizing potential of nitric oxide (NO) and a somewhat lesser excess of nitrogen dioxide and higher oxides is needed for maintaining the speed of the reaction. Stated another way, when the chips are submerged in the digestion zone, the amount of liquid used is 6 to 10 times the weight of the chips, dry basis, and the furnace gases are introduced in an amount sufficient to bring into the digestion zone, from 2% to 5% by weight (based upon the weight of the liquid) of oxides of nitrogen, calculated on the basis of nitric oxide (NO). The oxides of nitrogen render the entire mass acidic and since the oxidation of the wood mass (and consequent reduction of the oxides of nitrogen) goes on as the furnace gases are bubbled through, the acidic strength may never reach a strength equivalent to that corresponding to the amount of oxides of nitrogen introduced, were the wood chips not present. In this case the oxides of nitrogen are thus in a sense consumed as introduced and their concentration may be replenished continuously or as needed, during the digestion. There is thus afforded in the art of wood pulping a new expedient of maintenance of digestion potential, which is peculiarly useful in the continuous processes herein described and claimed.

In general, it may be stated that the time of cooking in the digester ranges from 5 to 25 hours and the temperatures range from 140° F. to 210° F. The chips are then drained and steamed which usually requires around 45 minutes, after which the chips are rinsed with hot and cold water, drained and then cooked for about 2 hours with about 2% sodium hydroxide solution.

Figure 2:
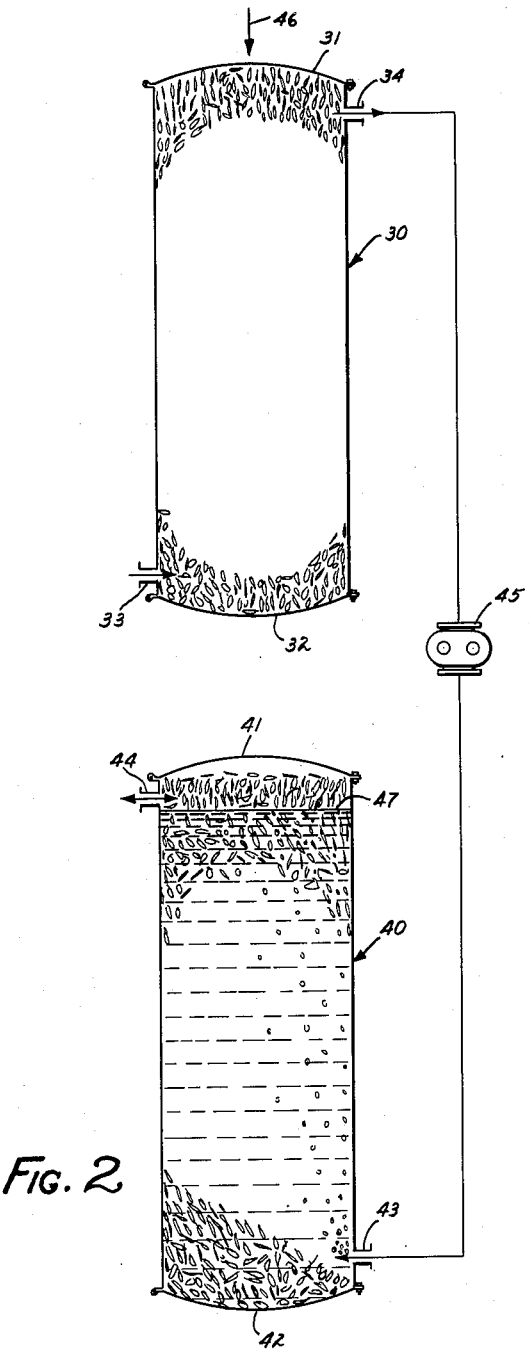
Figure 2 is a schematic drawing showing portions of the apparatus in vertical section illustrating a slightly modified form of apparatus for carrying out the processes thereof.

In Figure 2 there is illustrated an apparatus and procedure of the invention whereby the moistened chips are treated by blowing gases through them and are then treated in submerged condition. Thus, there are provided two digesters 30 and 40. The upper digester 30 is provided with a hinged upper cover 31 and a hinged lower cover 32, and with a gas inlet port at 33 and a gas outlet port at 34. The lower digester 40 is likewise provided with a hinged upper cover 41 and a hinged lower cover 42 and with a gas inlet port 43 and a gas outlet port 44. The outlet port 34 of the upper digester is connected through a pump 45 to the inlet port 43 of the lower digester. It will be assumed that the two digesters are positioned one over the other or that a conveyor is provided between them so when the covers 32 and 41 are opened the chips from the upper digester 30 may be dumped directly or conveyed into the upper opening of the lower digester 40.

In carrying out the process, chips 46 are introduced into the upper digester 30 until it is full. The chips are either pre-moistened or may be then moistened with steam or liquor from an earlier run which is introduced at port 33 until the chips are thoroughly wetted and then drained. A mixture of furnace gases of the type produced according to Patent 2,422,081 and as referred to in Patent 2,578,674 containing nitrogen oxides are then introduced at port 33 and permeate the entire digester 30, it being assumed that the covers 31 and 32 are closed. The furnace gases may either be hot, or previously cooled, as described above, and added wet steam may be included in the mixture so introduced so as to maintain the moisture of the chips and prevent scorching of the chips, where hot furnace gases are used. The gases pass through the chips within the digester 30, produce oxidation of the chips and the gases are themselves somewhat reduced. These gases then pass off at port 34 and still contain considerable amounts of nitric oxide and nitrogen dioxide. The gases are then pumped by the pump 45 into the inlet port 43 of the lower digester which is full of chips which are submerged in water or digestion liquor from a previous run up to the level 47. The gases introduced at 43 bubble through the lower digester, thus converting or maintaining the liquid therein in a condition of dilute nitric acid. The excess gases evolved and vented at port 44 contain traces of N₂O and NO, a trace of carbon dioxide, some N₂, oxygen and moisture. The digestion is continued for from 2 to 15 hours and the chips in the lower digester 40, which are assumed to have been previously treated in the upper digester 30, are removed by opening the head 42. After evacuating the digester 40, the head 42 is then closed and the head 41 opened, and by opening the head 32 of the digester 30, the load of moist chips treated therein can be dropped into the lower digester 40. Water, or water saturated with furnace gases, as from a previous run, is then introduced into the lower digester 40 and a fresh load of chips is introduced into the digester 30, the process then being repeated. A total treating time of the chips in the two digesters ranges from 5 to 25 hours. After the chips are delivered by the digester 40, they are drained, steamed and rinsed so as to remove traces of nitric acid and are then cooked with dilute sodium hydroxide for about two hours and mildly beaten so as to complete the pulping procedure.

Referring to Figure 3 there is illustrated a form of apparatus for continuous pulping of wood according to the apparatus and method of the present invention. Thus, there is provided a horizontal drum 50 having a central shaft 51 provided with a continuous spiral agitator 52 supported by spirally arranged spokes 53 situated along the shaft 51. Spiral flights may also be used. The shaft is slowly driven by a suitable power source not illustrated and in a direction so that the agitator 52 gradually pushes the load within the chamber 50 from right to left, as shown in Figure 3, this movement being illustrated by the arrow 52A. The chamber 50 is provided with an inlet port at 54 having a valve at 55 for the introduction of the chips to be treated, with an inlet port 56 having a valve 57 for introduction of the furnace gases used in the digestion procedure, and with an inlet port 58 provided with a valve 59 for the introduction of process steam and water. At the lower left-hand of the chamber 50, there is shown a delivery port at 60, having a spring loaded valve 61 thereon loaded by the spring 62. Within the tube 60 there is a shaft 63 held against endwise movement by the bearing 64 and arranged to be turned by a power source not shown. Upon the shaft 63 is provided a worm 65. Thus, when the shaft 63 is suitably rotated the digested chips are drawn through the tube 60 and forced out against the spring loaded valve 61 that is held against the delivery edge 67 of the tube 60 by the spring 62. In this way the digested chips are continuously delivered out of the tube 60 but the tube is essentially closed against the outward movement of reagents or steam or gases. The chamber 50 is also provided with a vent port at 70 having a valve 71 therein.

In carrying out the process of the invention in the apparatus 50, the chips to be pulped are introduced continuously through the feeding valve 55 which may be of the continuously rotating vane type. Accordingly, the chips inflowing at 72 are delivered into the interior of chamber 50. At the same time the valve 59 is opened sufficiently so as to maintain adequate moisture within the chamber 50 and liquid builds up and is maintained at approximately the level 74. If desired, a liquid level delivery port may be provided at 75 and provided with a valve at 76 so as to allow the draining off of liquid separately from the chips, the digested chips delivered through the tube 60. At the same time furnace gases containing nitrogen oxides at temperatures as explained above, are introduced through the port 56 at a rate determined by the valve 57, and the exhaust valve 71 is opened appropriately so as to permit exhausting of the gases passing through the chamber. The entire treating chamber 50 may be operated at or slightly above atmospheric pressure. The shaft 51 is then slowly rotated and the chips undergoing treatment are moved slowly to the left in Figure 3 as shown by the arrow 52A, and at the same time are repeatedly lifted and permitted to fall back through the atmosphere of furnace gases and into the liquid at 74. In so doing they are repeatedly exposed to the nitrogen oxide containing atmosphere in the space 78 above the liquid within the digester. This atmosphere is determined by the introduced furnace gases which are of the composition previously described and produced according to Patent 2,422,081 and mentioned in Patent 2,578,674. The furnace gases so introduced render the liquid 74 a dilute solution of nitric acid which is continuously reinforced by the introduction of oxides of nitrogen. The oxides of nitrogen are also absorbed directly on the chips or on the moisture on them, as the chips are picked up and dropped through the atmospheric gas 78 within the chamber. The rotation of the shaft 51 is timed and the length of the treating chamber 50 is made such that the chips move from the right to the left end in a period of from 5 to 25 hours and are then gradually evacuated from the chamber through the outwardly running feed screw 65.

The treatment of the resultant acid digested chips by steaming, rinsing and treatment with caustic for completion of the digestion is as previously described.

Referring to Figure 4 there is illustrated another form of continuous apparatus and method for the acid digestion of the chips of wood. In this form of the invention a long inclined stationary tube 90 is provided. The tube at its lower end is provided with a plenum chamber 91 having a port 92 having a valve 93 thereon for the introduction of furnace gases, a port 95 provided with a valve 96 for the introduction of steam, a port 97 provided with a valve 98 for the introduction of make-up water, and a delivery screw arrangement at 100. The delivery screw is provided with a drive shaft 101 and the screw 102 operating through the tubular portion 103 and against the spring biased plate 104. By rotation of the screw 101 the acid digested chips may be slowly withdrawn from the bottom of the plenum chamber 91. One or more valved water level control ports 111 may be provided in the vertical wall of the plenum chamber generally designated 91. At the upper end of the tube 90 there is provided an outlet vent 105 provided with a damper 106 for the control of the outflowing gases therefrom. There is also provided an inlet tube 107 having a worm screw 108 therein on the shaft 109. The tube 107 leads into the hopper 110. Within the tube 90 there is provided the shaft 112 adequately supported by bearings 113 in the end wall 114 and bearings 115 in a spider at the lower end of the tube 90. Other intermediate bearings may also be provided on the shaft 112. A number of spirally arranged flights 116 are provided along the shaft 112. In operation, the wood chips are introduced into the hopper 110 and are introduced as a continuous flow through the tube 107 into the upper end of the gradually slanting tube 90. Water which may be acidulated by furnace gases before the run is started is brought up to approximately the lever 118, this water being introduced through the tube 97 by operation of the valve 98. Steam may be introduced through tube 95 if needed for moistening the chips, if the chips are not already previously moistened. The valve 93 is then opened and furnace gases are blown into the plenum chamber 91. Furnace gases of the composition previously described are then introduced through the inlet port 92 by opening the valve 93 and are permitted to pass through the plenum chamber 91 and through the tube 90 and are vented under control by opening damper 106 in the vent tube 105. The shaft 112 is slowly revolved and the inflowing chips which enter through the feed tube 107 flow into the upper end of the tube 90. The chips are slowly lifted by the flights 116 on the shaft 112 and as they are lifted they are exposed to the atmosphere furnace gases containing nitric oxide (NO) and nitrogen dioxide ($NO_2$) and other oxides of nitrogen. The chips being subjected to steam or previously moistened are thus rendered acid, dilute nitric acid being formed directly on the chips and in the liquid at 118. The chips are accordingly repeatedly subjected to an atmosphere of dilute nitric acid in which moisture is maintained and the temperature held by the introduction of the steam and the hot furnace gases. The time of passage of the continuous flow of chips through the tube 90 and gradually into the liquid 118 and thence out through the bottom of the plenum chamber 91, due to the action of the screw feed 100, varies from 5 to 25 hours, depending largely upon the temperature of reaction and the state of subdivision of the chips. In general, it may be stated that smaller size chips are more easily digested than the larger sizes and the digestion proceeds more rapidly at the higher temperatures of, say, 210° F. than at the lower ranges of, say, 140° F. From the vent 105 there is liberated a gaseous mixture containing oxygen, nitrogen, some water vapor and traces of carbon dioxide, $N_2O$ and NO.

The acid digested chips delivered out of the valve 104 are then steamed, rinsed and treated with caustic as previously described from completing the pulping procedure.

In the foregoing processes the introduction of furnace gases may be terminated or reduced after the liquid within the digester is rendered thoroughly acid. The digestion process then continues due to the acid content of the liquor until completed. The introduction of furnace gases may thus be interrupted or reduced in rate, particularly where the chips are submerged, somewhat before the digestion procedure is completed. Throughout as much as one-third to one-half of the digestion procedure the digestion may thus be carried on without the introduction of additional furnace gases.

As many apparently widely different embodiments of this invention may be made without departing from the spirit and scope thereof, it is to be understood that I do not limit myself to the specific embodiments herein.

What I claim is:

1. In the process of producing wood pulp the improvement which consists essentially of introducing wood in divided form into a treating zone along with sufficient moisture so as thoroughly to wet the wood, introducing into and passing through said treating zone a mixture of furnace gases comprising oxides of nitrogen in an amount ranging from .8% to 2% by volume of the furnace gases and calculated on the basis of nitric oxide, said furnace gases being introduced progressively during the course of the treatment in an amount sufficient to provide 350 to 500 pounds of oxides of nitrogen, calculated on the basis of nitric oxide, for each ton of wood, dry basis, that is treated, digesting the mixture of wet wood and furnace gases for a period of 5 to 25 hours at a temperature of about 140° to 210° F., and thereafter removing and draining the so treated wood.

2. In the process of producing wood pulp, the improvement which consists essentially of introducing wood in divided form into a treating zone along with sufficient moisture at least partially to submerge said wood, introducing into and passing through said treating zone a mixture of furnace gases comprising oxides of nitrogen in an amount ranging from .8% to 2% by volume of the furnace gases and calculated on the basis of nitric oxide, said gases being introduced into the partially submerged divided wood in said treating zone, said furnace gases being introduced progressively during the course of the treatment in an amount sufficient to provide about 350 to 500 pounds of oxide of nitrogen calculated on the basis of nitric oxide for each ton of wood, dry basis, that is treated, digesting the mixture of wet wood and furnace gases for 5 to 25 hours at a temperature in the range of 140° to 210° F., and thereafter removing and draining the so treated wood.

3. The process of claim 2 further characterized in that the divided wood is repeatedly agitated in contact with the liquid and furnace gases in said treating zone during said period of digestion.

4. The process of claim 2 further characterized in that steam is admitted along with said furnace gases into said reaction zone.

5. In a process of producing wood pulp, the improvement which consists essentially of introducing furnace gases comprising oxides of nitrogen in an amount ranging from .8% to 2% by volume of the furnace gases and calculated on the basis of nitric oxide at a temperature in the range of 600° to 700° F. cooled to a temperature not substantially below 140° F. into and through a treating zone containing subdivided wood and sufficient water so as to render the wood thoroughly moist, said cooled furnace gases being introduced progressively during the course of the treatment in an amount sufficient to provide from 350 to 500 pounds of oxides of nitrogen calculated on the basis of nitric oxide, for each ton of wood, dry basis, that is treated, digesting said mixture of wet subdivided wood and furnace gases for a period of 5 to 25 hours at a temperature in the range of about 140° to 210° F., and thereafter removing and draining the so treated wood.

6. In the process of producing wood pulp, the improvement which consists essentially of introducing furnace gases comprising oxides of nitrogen in an amount ranging from .8% to 2% by volume of the furnace gases and calculated on the basis of nitric oxide at a temperature in the range of 600° to 700° F., into a reaction chamber containing wood in divided form along with moisture sufficient at least partially to submerge said wood, permitting the furnace gases to pass through the moistened and submerged subdivided wood and thence up through the unsubmerged subdivided wood, continuing the introduction of said furnace gases until from 350 to 500 pounds of oxides of nitrogen, calculated on the basis of nitric oxide, are introduced for each ton, dry basis, of wood so treated, maintaining the temperature of the reaction mass comprising wood, moisture and thus introduced components of furnace gases in the temperature range of 140° to 210° F. for a period of 5 to 25 hours, and thereafter draining and removing the so treated wood.

7. The process of claim 6 further characterized in that the mixture of wood in divided form, water and furnace gases is agitated during the reaction period.

8. The process of producing wood pulp consisting essentially of introducing furnace gases comprising oxides of nitrogen in an amount ranging from .8% to 2% by volume of the furnace gases and calculated on the basis of nitric oxide through a first reaction zone containing moistened wood chips and then through a second reaction containing previously treated wood chips submerged in an aqueous solution, the temperature in each of said zones being maintained in the range of 140° to 210° F., removing the wood thus treated in the second zone, transferring the wood treated in the first zone into said second zone and introducing a fresh batch of moistened subdivided chips in the first zone, thereafter continuing the passage of furnace gases through said zones, the total time of treatment of the subdivided wood with the furnace gases in the first and second zones being from approximately 5 to approximately 25 hours, the total amount of furnace gases passed through said first and second zones being sufficient to introduce into said treating zones 350 to 500 pounds of oxides of nitrogen calculated on the basis of nitric oxide for each ton of wood, dry basis, treated therein.

References Cited in the file of this patent

UNITED STATES PATENTS

| Number | Name | Date |
|---|---|---|
| 29,059 | Clemo | July 10, 1860 |
| 224,000 | Cummings | Feb. 3, 1880 |
| 322,882 | Young et al. | July 21, 1885 |
| 848,484 | Newnham | Mar. 26, 1907 |
| 1,505,934 | Olier | Aug. 19, 1924 |
| 1,679,336 | Dunbar | July 31, 1928 |
| 1,829,852 | Darling | Nov. 3, 1931 |
| 1,938,802 | Braun et al. | Dec. 12, 1933 |
| 1,975,161 | Kipper | Oct. 2, 1934 |
| 2,007,348 | Scharmann et al. | July 9, 1936 |
| 2,183,643 | Dreyfus | Dec. 19, 1939 |
| 2,287,332 | Steely | June 23, 1942 |
| 2,301,314 | Montonna et al. | Nov. 10, 1942 |
| 2,422,081 | Cattrell | June 10, 1947 |
| 2,466,290 | Wells | Apr. 5, 1949 |
| 2,578,674 | Daniels et al. | Dec. 18, 1951 |

OTHER REFERENCES

Aronovsky et al.: Paper Ind. and Paper World, June 1939, pages 335–343.

Heuser et al.: Paper Trade J., March 9, 1944, page 30.